United States Patent
Puszkiewicz et al.

(10) Patent No.: US 6,561,546 B2
(45) Date of Patent: May 13, 2003

(54) POTHOLE PROTECTION MECHANISM

(75) Inventors: Ignacy Puszkiewicz, Smithsburg, MD (US); Muhammad Sannah, Greencastle, PA (US); Louis A. Bafile, Mercersburg, PA (US)

(73) Assignee: JLG Industries, Inc., McConnellsburg, PA (US)

( * ) Notice: Subject to any disclaimer, the term of this patent is extended or adjusted under 35 U.S.C. 154(b) by 10 days.

(21) Appl. No.: 09/876,069

(22) Filed: Jun. 8, 2001

(65) Prior Publication Data

US 2002/0185850 A1 Dec. 12, 2002

(51) Int. Cl.[7] .............................................. B66C 23/88
(52) U.S. Cl. .................... 280/755; 280/764.1; 212/196; 212/305
(58) Field of Search ................................ 280/755, 758, 280/763.1, 764.1, 765.1, 766.1; 212/301, 302, 303, 304, 305, 196; 414/673, 719; 182/141; 187/243; 254/8 R, 8 B, 8 C, 9 R, 9 B, 9 C, 10 R, 10 B, 10 C

(56) References Cited

U.S. PATENT DOCUMENTS

| | | | |
|---|---|---|---|
| 3,746,364 A | | 7/1973 | Kemner |
| 4,175,644 A | * | 11/1979 | Sikli .......................... 187/243 |
| 4,393,959 A | | 7/1983 | Acker |
| 4,401,408 A | | 8/1983 | Gibert |
| 4,536,009 A | * | 8/1985 | Ashworth .................... 280/755 |
| 4,569,422 A | * | 2/1986 | Hoffman ........................ 188/7 |
| 4,784,400 A | * | 11/1988 | Hofius ...................... 280/6.153 |
| 5,118,126 A | * | 6/1992 | Yaple ......................... 280/293 |
| 5,388,857 A | | 2/1995 | Wernimont et al. |
| 5,639,119 A | | 6/1997 | Plate et al. |
| 5,685,563 A | | 11/1997 | Ottestad |
| 5,890,737 A | | 4/1999 | Hutka |
| 5,947,516 A | | 9/1999 | Ishikawa |
| 6,056,501 A | | 5/2000 | Ishikawa et al. |
| 6,082,742 A | | 7/2000 | Ishikawa |
| 6,425,459 B1 | * | 7/2002 | Keefer ....................... 182/69.5 |

* cited by examiner

Primary Examiner—Paul N. Dickson
Assistant Examiner—David R. Dunn
(74) Attorney, Agent, or Firm—Nixon & Vanderhye P.C.

(57) ABSTRACT

A pothole protection mechanism for a lift machine includes a frame that is securable to the lift machine, a pothole protection bar movably coupled with the frame via a support linkage, and an actuator coupled between the frame and the pothole protection bar. The actuator is sized for a force sufficient only to lift the pothole protection bar. The support linkage includes a coupling bar driven by the actuator that is connected between two pivot joints secured between the frame and the pothole protection bar. In the extended or deployed position, the pivot joints are pivoted to an over-center position and the coupling bar is abutted against a stop. As such, when a vehicle to which the pothole protection mechanism is attached falls into a pothole or off a curb or the like, the weight of the machine is supported by the pothole protection bar and support linkage and not by the actuator. In preferred forms, the pothole protection mechanism is without a mechanical linkage between platform lift and pothole protection mechanisms.

20 Claims, 6 Drawing Sheets

POTHOLE PROTECTION MECHANISM

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The present invention generally relates to lifting devices and, more particularly, to a pothole protection mechanism for a lift machine that helps to prevent a lift machine from tipping over when a pothole, bump, curb or other support threatening and tip generating hazard is encountered.

Typical pothole protection mechanisms contain horizontal bars or the like installed on sides of a vertical lift platform vehicle. The bars are deployed or extended when the platform is raised, and the bars are lifted or retracted when the platform is lowered to allow the machine to drive over ramps, obstacles and the like.

Current mechanisms have a mechanical link between the pothole protection mechanism and a lifting mechanism of the lifting platform. In a typical configuration, the lifting platform releases the pothole protection mechanism via a mechanical link or the like, and the pothole protection mechanism is deployed or extended by force of gravity and/or a system of springs. The deployment force is limited to avoid a crushing hazard to objects accidentally placed in the bar's way. The limitation of the deployment force is done by mechanical means as only gravity and/or weak springs are used for deployment. A separate position sensor is used to verify full deployment of the mechanism. During lowering of the lifting platform, a component of the platform lifting mechanism, such as a scissors arm or a specially designed bracket attached to the scissors arm, pushes a mechanical linkage to raise the horizontal bars of the pothole protection mechanism.

An example of a related configuration is described in U.S. Pat. No. 5,890,737 to Hutka. A lifting device 10 includes a main frame 12 supported by a plurality of support members 14 such as wheels. A plurality of scissors members 16A–16F are arranged in a conventional criss-crossing manner to elevate and support a work platform 18. A hydraulic cylinder 20 raises and lowers the platform 18. A subframe 22 includes two large sheet metal boxes or trays that define a planar bottom wall 26. The mechanism includes structure for raising and lowering the subframe with respect to the ground due to movement of the platform 18.

It would be desirable in certain instances to extend or retract the pothole protection mechanism in a lift machine based on other factors than just position of the lifting platform. Such conditions may be related to (for example) load on the platform, position of the extendable deck, etc. On multipurpose machines, which can lift people and material using separate lifting devices, actuation can be initiated by load and position of the material handling device. Moreover, with the typical pothole protection mechanism construction, since there is a mechanical link between the lifting platform and the mechanism, the mechanical linkage must be sized to support the entire weight of the lifting platform. With known designs, the mechanical linkage can be divided into two subsystems: a linkage that supports the weight (which forms part of the new system) and a control (activation) linkage that provides a connection between the platform and the weight supporting linkage—this linkage, which is complicated and difficult to maintain, is eliminated in the proposed system. Using a small actuator to retract and possibly deploy the pothole protection mechanism could significantly reduce manufacturing and operational costs.

BRIEF SUMMARY OF THE INVENTION

To obviate the problems associated with previous pothole protection mechanisms, a mechanism of the present invention is preferably raised and lowered by an independent actuator, i.e., without any mechanical linkage to the platform lifting component. Moreover, while lowering the pothole protection bar of the pothole protection mechanism, the actuator basically supports only the weight of the mechanism components, letting them descend in a controlled manner. When fully deployed, the support linkage for the pothole protection bar is positioned in an over-center position against a mechanical stop such that when the machine drops into a pothole or the like, its weight is supported by the bar and support linkage, and not by the actuator. As a consequence, the actuator can be sized for a force necessary only to lift the pothole protection mechanism, not to support the weight of the machine.

In accordance with an exemplary embodiment of the invention, a pothole protection mechanism for a lift machine includes a frame securable to the lift machine, a pothole protection bar movably coupled with the frame via a support linkage, and an actuator coupled between the frame and the pothole protection bar. As noted, the actuator is preferably sized for a force sufficient only to lift the pothole protection bar. As also noted, the pothole protection mechanism is preferably without a mechanical linkage for securing to a lifting component of the lift machine. The actuator may be an electromechanical actuator that drives the pothole protection bar between a retracted position and an extended position. Alternatively or additionally, the mechanism may include a latching assembly coupled between the frame and the pothole protection bar that releasably secures the pothole protection bar in the retracted position. In this context, the actuator drives the pothole protection bar from the extended position to the retracted position.

The support linkage may include a pair of two-link joints that pivot at a link attachment point with each of the two-link joints being secured at a first end to opposite sides of the frame, respectively, and at a second end to the pothole protection bar. A coupling bar is attached to each link attachment point of the two-link joints between the two-link joints, and the actuator is attached to the coupling bar. In this context, the pothole protection bar is movable between a retracted position and an extended position, and in the extended position, the two-link joints are pivoted to an over-center position and the coupling bar is abutted against a stop. In a preferred configuration, the actuator is in an extended position when the pothole protection bar is in its retracted position, and the actuator is in a retracted position when the pothole protection bar is in its extended position.

In an alternative arrangement, the support linkage includes a coupling bar driven by the actuator that pivots a joint secured between the frame and the pothole protection bar between an extended position and a retracted position. The coupling bar is abutted against a stop when the joint is in the extended position.

The actuator may include stroke switches that provide a signal to indicate when the pothole protection bar is in a fully extended position and a fully retracted position, respectively. Moreover, the actuator may include structure for detecting obstacles in a path of the pothole protection bar, such as a current-monitoring circuit coupled with the actuator that monitors current to the actuator.

In accordance with another exemplary embodiment of the invention, a lift machine includes a base supporting a lifting platform, the lifting platform being displaceable between a lowered position and a raised position via a lifting mechanism, and the pothole protection mechanism of the present invention. With the lift machine of the invention, the frame of the pothole protection mechanism is secured to the base. Wheels may be rotatably mounted on respective axles secured to the base, and a driving system coupled with the wheels provides motive power to the wheels.

A sensor monitors a position of the lifting platform. In this context, the pothole protection mechanism may further include a controller communicating with the sensor, the driving system and the actuator. The controller controls operation of the driving system and the actuator based on a signal received from the sensor. The controller is configured such that when the lifting platform is raised above the lowered position beyond a trigger point, the controller prevents operation of the driving system until the pothole protection mechanism is fully deployed. Additionally, when the lifting platform is raised above the lowered position beyond a trigger point and the pothole protection mechanism is deployed, the controller prevents retraction of the pothole protection mechanism until the lifting platform is lowered below the trigger point. The actuator preferably includes structure for detecting obstacles in a path of the pothole protection bar, wherein the controller prevents operation of the driving mechanism and operation of the pothole protection mechanism if an obstacle is detected in the path of the pothole protection bar.

The controller generally controls operation of the pothole protection mechanism according to factors independent of the lifting platform height. If the lift machine includes a platform extension coupled with the lifting platform, one of the factors for controlling operation of the pothole protection mechanism may include a position of the platform extension. Additionally, other factors for controlling operation of the pothole protection mechanism include any of a position of a material handling device, a load on the platform, a load on the material handling device, a configuration of the lift machine, etc.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
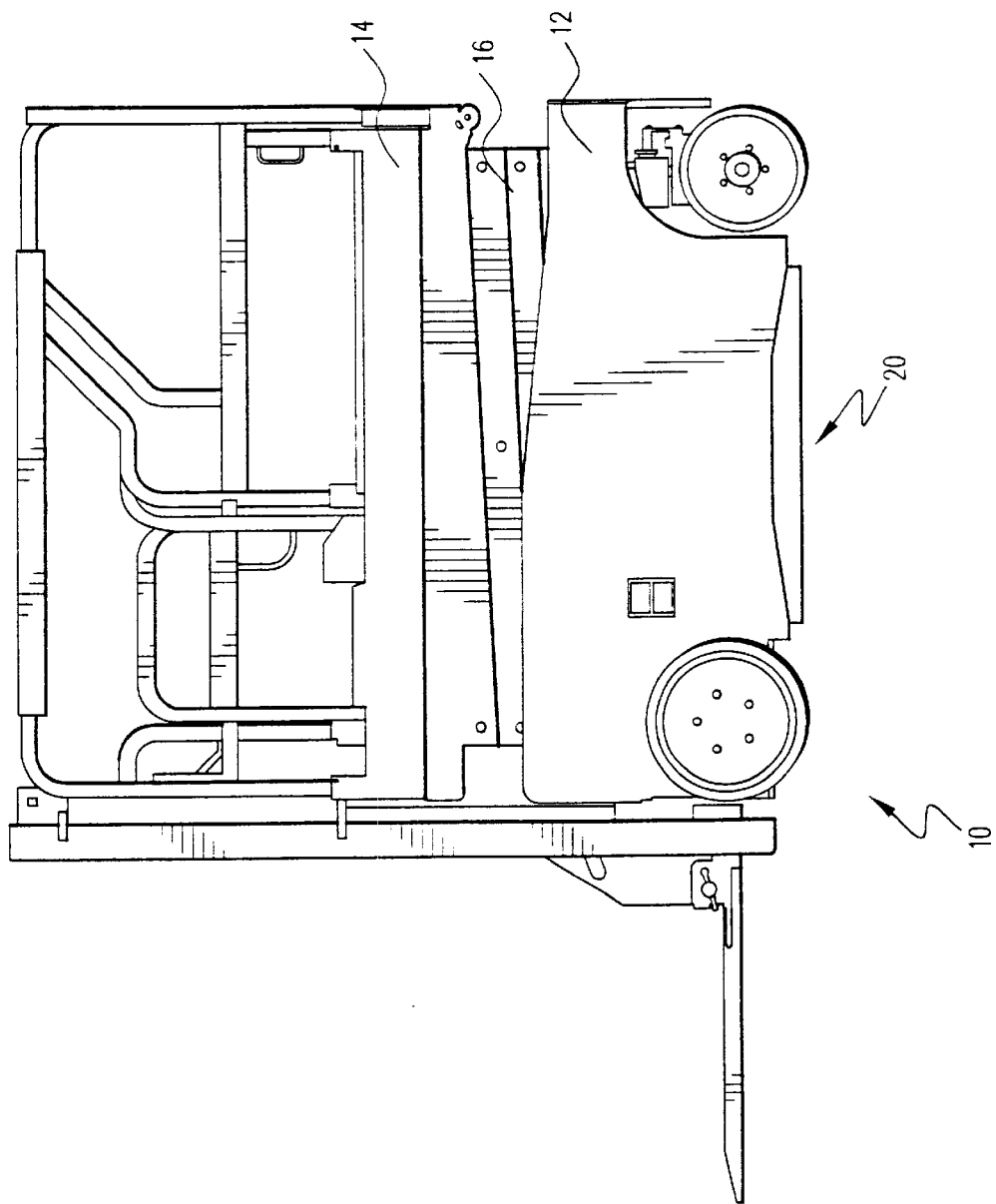
FIG. 1 is a side view of a multipurpose lift vehicle for which the pothole protection mechanism of the present invention is particularly suited.

FIG. 1 illustrates generally a multipurpose machine 10 that is configured with both fork truck functionality and scissors lift functionality. This multipurpose machine 10 itself is the subject of co-pending U.S. patent application Ser No. 09/922,805, filed Aug. 7, 2001. The machine 10 includes a base or chassis 12 that supports a lifting platform 14 or the like. The lifting platform 14 as shown is raised and lowered via a scissors lift 16, although any suitable lifting structure could be used, and the invention is not meant to be limited to the illustrated example.

With such a vehicle including platform lifting capability, it is desirable to protect from potential tipping hazards in various machine configurations. For example, when the platform 14 is raised, thereby correspondingly raising the machine's center of gravity, if the machine should fall into a pothole or fall off of a curb or the like during transport, the machine may be susceptible to tipping. Other configurations of the machine 10 may create a tipping hazard, requiring deployment of the pothole protection mechanism. For example, if the machine includes a platform extension, a position of the platform extension may require deployment of the mechanism. Other conditions may include any of a position of a material handling device, a load on the platform, a configuration of the machine, etc. According to the present invention, a pothole protection mechanism 20 is secured to the machine base 12 preferably between the wheels of the machine 10 that serves to provide added stability to the machine when machine stability is a concern.

Figure 2:
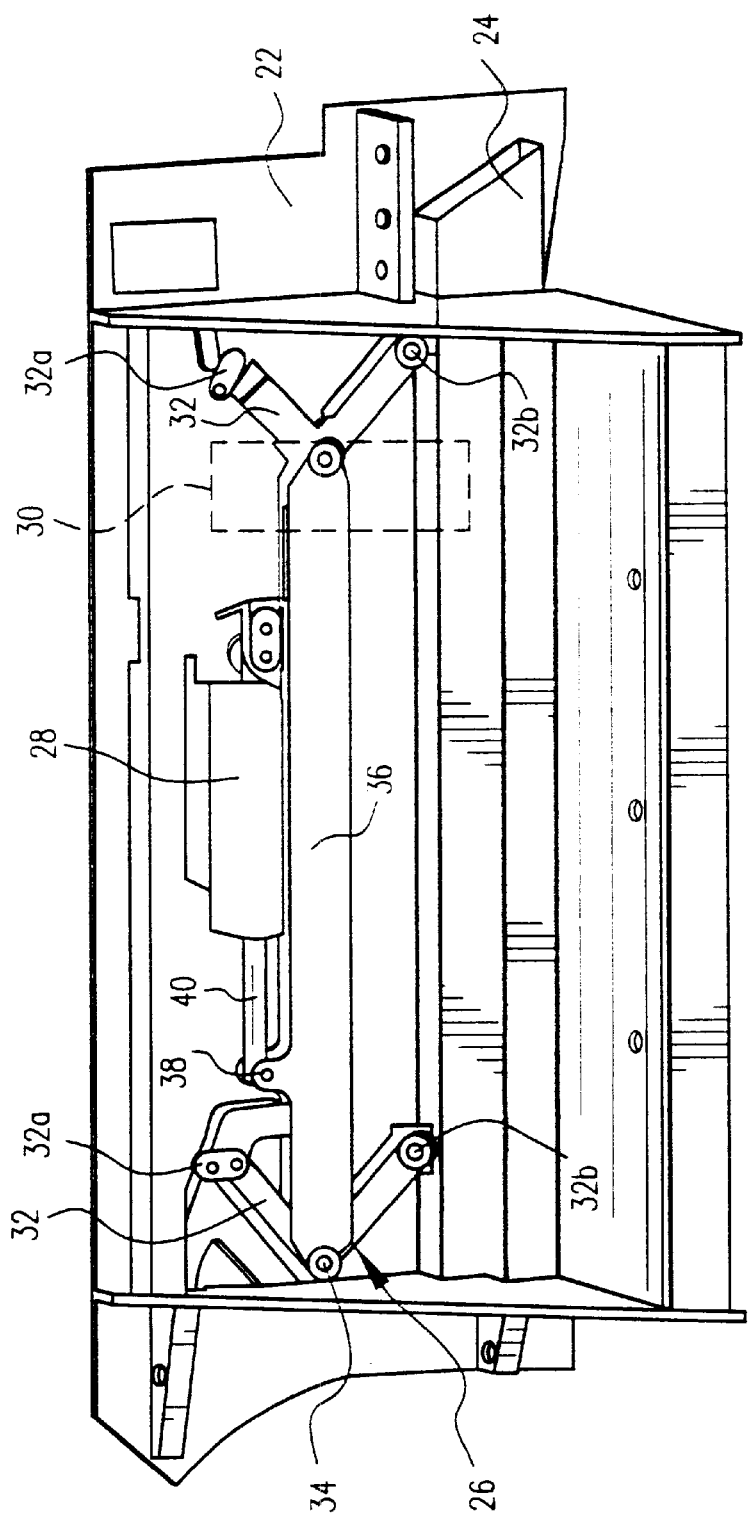
FIG. 2 shows the pothole protection mechanism according to the invention in a retracted configuration.
Figure 3:
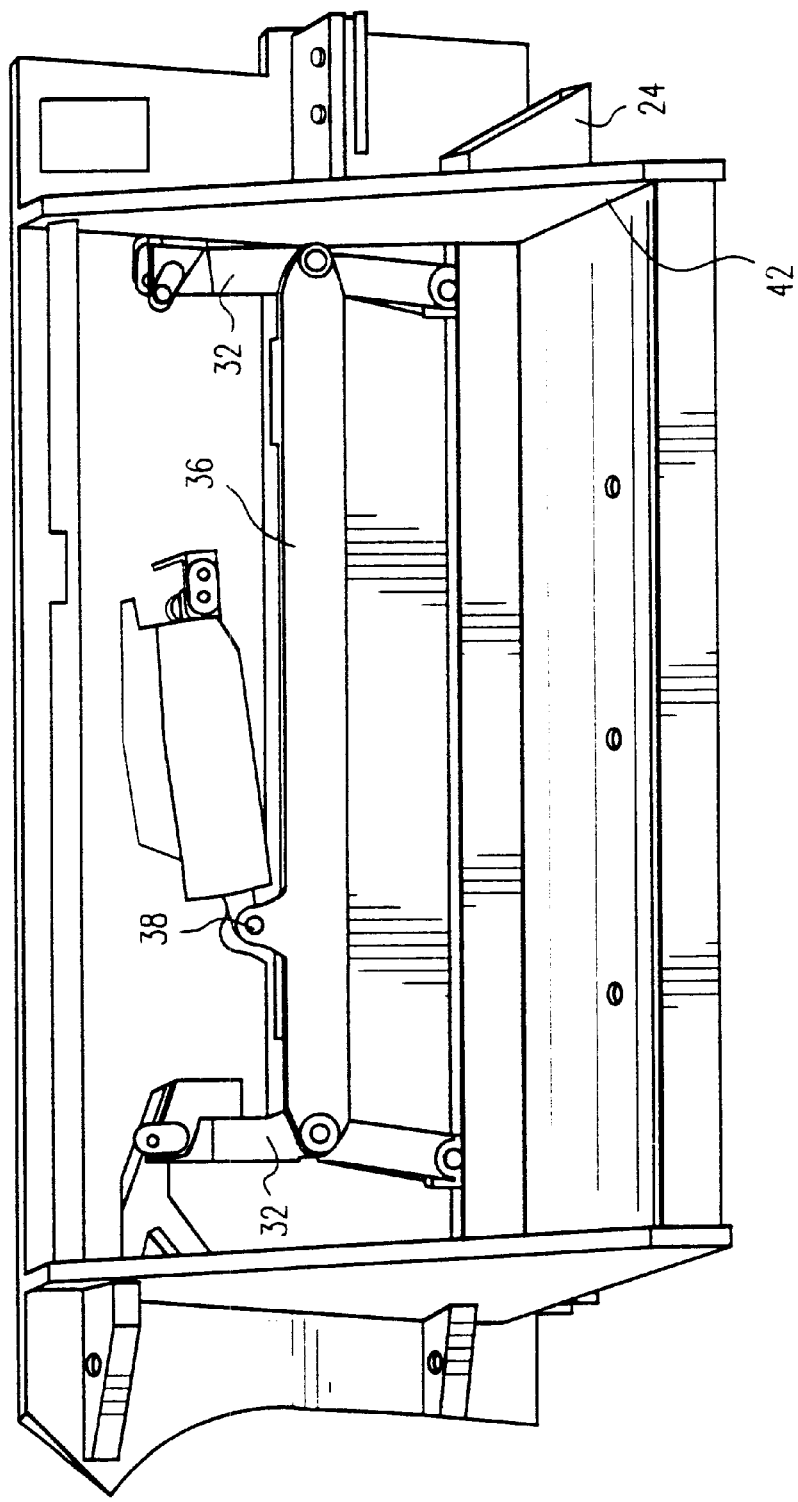
FIG. 3 shows the pothole protection mechanism in a deployed or extended configuration.

FIGS. 2 and 3 are detailed illustrations of the pothole protection mechanism 20 according to the present invention in a retracted position and an extended or deployed position, respectively. The pothole protection mechanism 20 includes a frame 22 that is securable to the machine base 12 via any suitable fastening means such as bolts or the like. A pothole protection bar 24 is movably coupled with the frame 22 via a support linkage 26. An actuator 28 is coupled between the frame 22 and the pothole protection bar 24 via the linkage 26.

The actuator 28 is preferably an electromechanical actuator that drives the pothole protection bar 24 between the retracted position shown in FIG. 2 and the extended position shown in FIG. 3. Other types of actuators, such as hydraulic (or pneumatic) cylinders, hydraulic (or pneumatic) rotary actuators, etc., may also be used. In an alternative arrangement, a latching assembly 30 (shown schematically in phantom in FIG. 2) may serve to releasably secure the pothole protection bar 24 in the retracted position such that when the latching assembly is released, the pothole protection bar 24 is extended to its deployed position by the force of gravity, springs or other structure independent of the actuator 28. In this embodiment, the actuator 28 drives the pothole protection bar 24 from its extended position back to its retracted position.

The support linkage 26 includes a pair of two-link joints 32 that pivot at a link attachment point 34 as shown. Each of the two-link joints 32 are secured at a first end 32a to opposite sides of the frame 22 as shown and at a second end 32b to the pothole protection bar 24. A coupling bar 36 is attached between the two-link joints 32 at each link attachment point 34. The actuator 28 is attached to the coupling bar 36 at 38.

As shown in FIG. 2, the actuator 28 includes an actuator arm 40 or the like that is extended while the pothole protection bar 24 is in its retracted position. As shown in FIG. 3, this actuator arm 40 is retracted when the pothole protection bar 24 is in its extended or deployed position. The joints 32 are readily pivoted from the position shown in FIG. 2 toward the pothole protection bar extended position by one or more of the actuator 28, springs, gravity, etc. As the pothole protection bar 24 reaches its fully extended or deployed position as shown in FIG. 3, the two-link joints 32 are pivoted to an over-center position, and the coupling bar 36 is abutted against a stop defined by one or more of the joints 32, a sidewall 42 of the frame 22, and the attachment point 38 of the actuator arm 40 to the coupling bar 36. Of course, the mechanical stop can be incorporated elsewhere in the assembly, such as adjacent the other of the two-link joints 32 or adjacent a different portion of the coupling bar 36 or the like, and the invention is not meant to be necessarily limited to the illustrated configuration. When the support linkage 26 and particularly the coupling bar 36 is abutted against a mechanical stop in the pothole protection bar extended position, when the vehicle 10 falls into a pothole or off a curb or the like, the weight of the machine is supported through the pothole protection bar 24, support linkage 26 and frame 22 and not through the actuator 28. As a consequence, the actuator 28 may be of a smaller size with a force sufficient only to lift the pothole protection bar 24.

An important feature of the present invention is that the actuator 28 is controlled substantially independently of a position of the lifting platform 14. That is, in contrast with conventional pothole protection mechanisms, the pothole protection mechanism 20 according to the present invention is without a mechanical linkage to a lifting component such as an arm of the scissors lift 16 or the like of the lift machine 10. By virtue of the independently operable actuator 28, the actuator 28 itself is never required to support the weight of the machine. With a mechanical linkage between the pothole protection mechanism and a lifting component of the machine, as the platform or the like is lifted via the lifting component, the pothole protection mechanism is being deployed, resulting in an actuator linkage of the pothole protection mechanism supporting the entire weight of the machine.

The actuator 28 may include end stroke switches preferably integrated into the actuator design to avoid separate installation. The end stroke switches provide a signal to indicate when the pothole protection bar 24 is in a fully extended position and a fully retracted position, respectively. If the actuator 28 is an electromechanical actuator, monitoring its condition can indicate full deployment of the pothole protection system, eliminating the need for separate position sensors.

A current-monitoring circuit built into the machine's controller is preferably coupled with the actuator for monitoring a current to the actuator. Since during lowering of the pothole protection bar 24, any current necessary to drive the actuator is very low and of a predictable and repeatable value, any substantial increases in the current prior to full deployment can serve as an indication that an obstacle has been encountered. Thus, once the current to the actuator 28 exceeds a preset limit, deployment of the pothole protection bar 24 is halted, and the mechanism may be retracted so that the obstacle can be removed.

Figure 4:
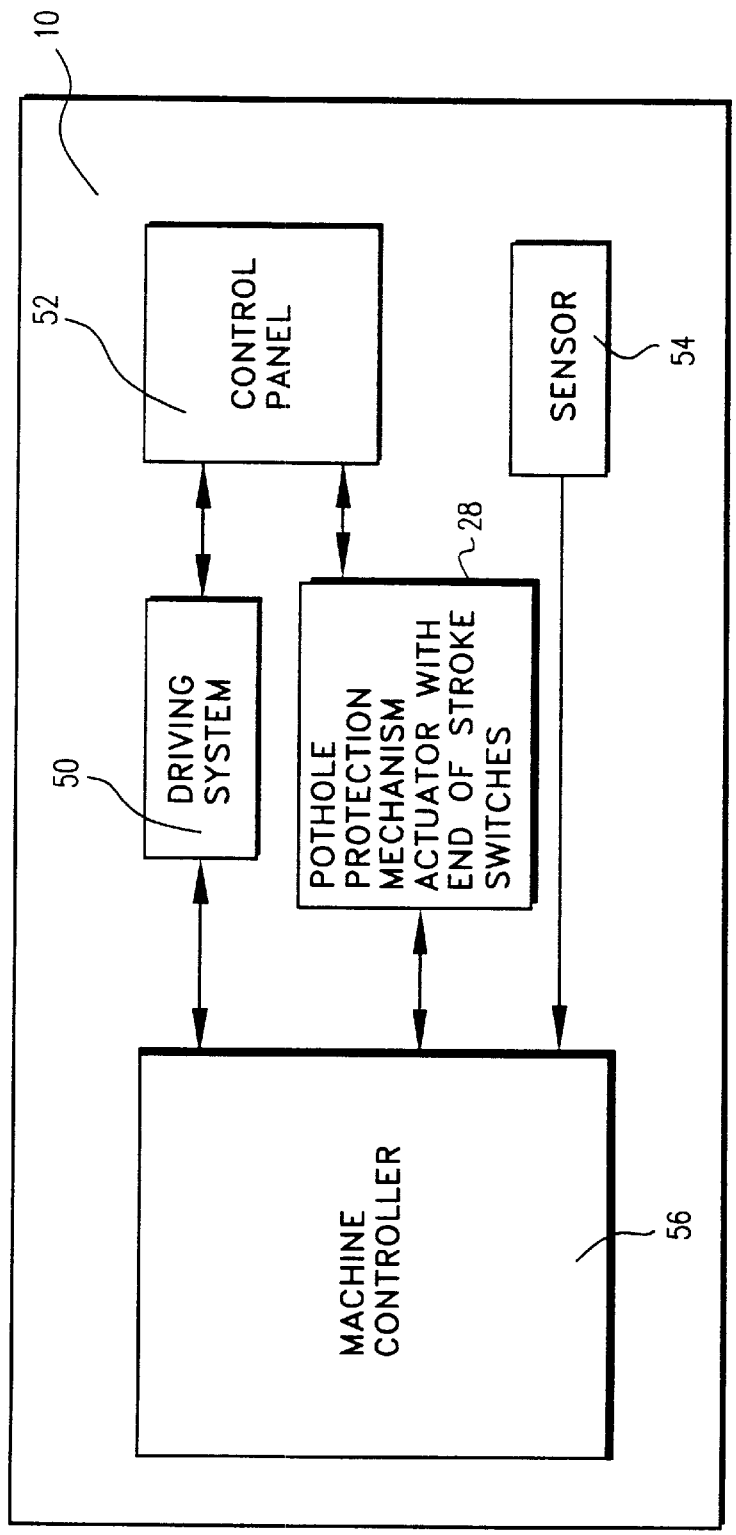
FIG. 4 is a schematic illustration incorporating a controller according to the present invention.

A schematic illustration of the lift machine and lift machine control components is shown in FIG. 4. Wheels of the machine 10 (shown in FIG. 1) are rotatably mounted on respective axles secured to the base or chassis 12. A driving system 50 powers the wheels 10 via gears and the like and provides motive power. The drive system 50 is powered by a hydraulic motor or directly by an electric motor. The machine 10 also contains lifting components. In a preferred arrangement, there are two lifting mechanisms, both actuated by means of actuators such as, for example, hydraulic cylinders. All mechanisms of the machine 10 are powered by an engine or electric motor either directly or by means of the hydraulic system.

The driving system 50 is controlled by an operator via a control panel 52 secured to the machine 10 in a convenient location. The actuator 28 of the pothole protection mechanism 20 can also be activated, independently, via the control panel 52. A sensor 54 monitors a position of the lifting platform 14. The sensor 54 may be an angle measuring device or the like to monitor the platform position. A machine controller 56 communicates with the driving system 50, actuator 28 and sensor 54 and controls the operation of the driving system 50 and the actuator 28 based on a signal received from the sensor 54. As such, although the pothole protection mechanism is without a mechanical linkage to a lifting component of the lift machine, deployment of the pothole protection mechanism can be triggered according to various factors, such as a position of the lifting platform, a position of a platform extension that is coupled with the lifting platform if provided, a position of a material handling device, a load on the platform, a configuration of the lift machine, etc.

In a similar manner, the driving system 50 can be controlled by the controller 56 according to a position of the pothole protection mechanism 20. That is, for example, the driving system 50 may be disabled when the lifting platform 14 is above a predefined trigger point and the pothole protection mechanism 20 is not fully deployed. Moreover, if an obstacle is detected in the path of the pothole protection bar 24, the controller 56 can prevent further deployment of the actuator 28. In this context, it is preferred that the platform 14 is required to be lowered and the obstacle removed before resetting the pothole protection mechanism operation. To retract the pothole protection mechanism 20, the lifting platform 14 may be required to be lowered to the same height as the position in which deployment was initiated. In this context, the controller 56 deactivates a driving system 50 until the pothole protection mechanism 20 is fully retracted. As a result, the machine can be driven as soon as platform motion stops.

Figure 5:
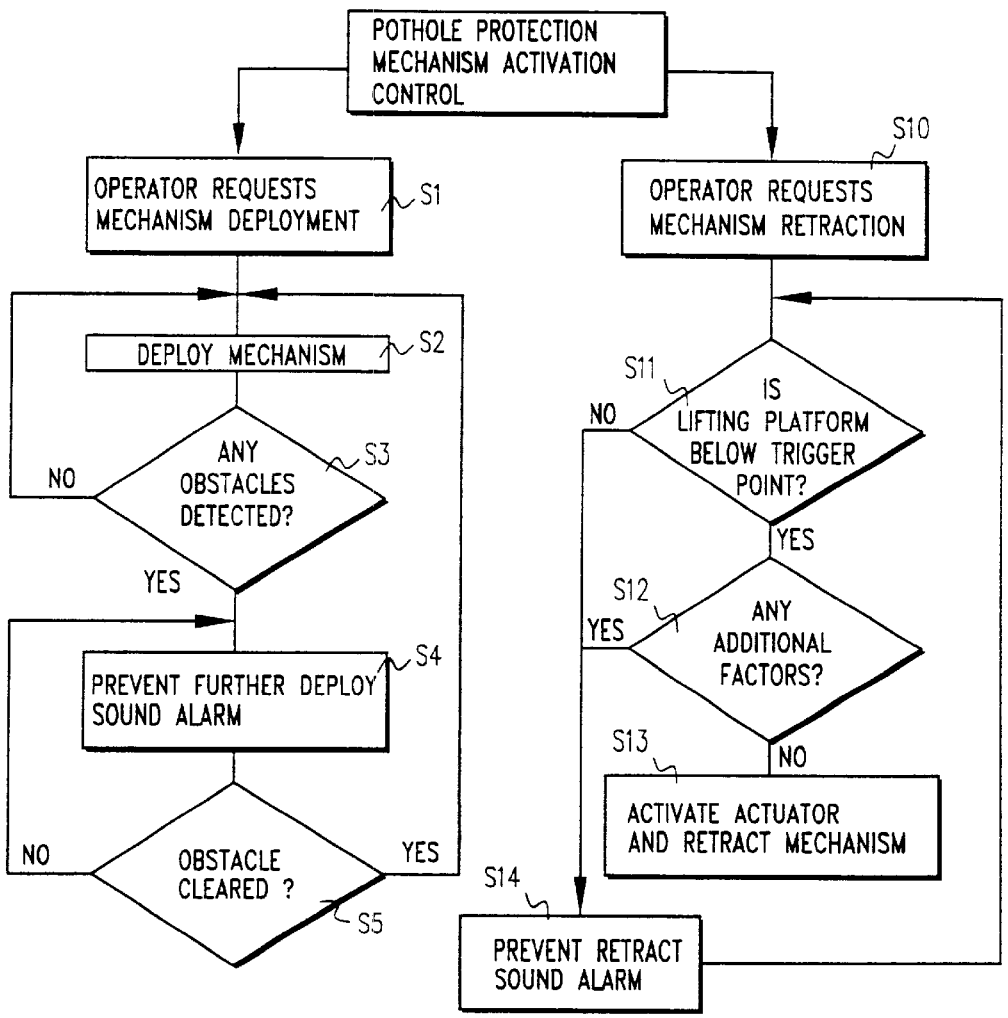
FIG. 5 is a flow diagram showing pothole mechanism activation control.

FIG. 5 is a flow diagram illustrating a control operation of the pothole protection mechanism 20. In step S1, the operator requests deployment of the pothole protection mechanism 20 via the control panel 52. As the pothole protection bar 24 is deployed in step S2, a determination is made (step S3) as to whether any obstacles are in the path of the pothole protection bar 24. If not (NO in step S3), deployment of the pothole protection bar 24 is continued. If an obstacle is detected (YES in step S3), the controller 56 prevents further deployment of the mechanism and sounds an alarm (step S4) or otherwise indicates a problem. The controller 56 determines whether the obstacle has been cleared in step S5, and if so (YES in step S5), deployment of the pothole protection mechanism 20 is reset and continued.

When the pothole protection mechanism 20 is deployed and the operator requests mechanism retraction via the control panel 52 (step S10), the controller 56 determines whether the lifting platform 14 is below a trigger point (step S11). As noted above, the trigger point may be predefined or may be set in each instance to the height at which deployment was initiated. If the lifting platform 14 is below the trigger point (YES in step S11), the controller 56 determines whether any additional factors should be addressed before retracting the pothole protection mechanism 20 (step S12). As discussed above, such factors may include the position of a platform extension, a position of a material handling device, a load on the platform, a general configuration of the lift machine, etc. Generally, any additional factor that may affect the center of gravity of the machine and hence its susceptibility to tipping can be considered. If no additional factors exist (NO in step S12), the controller 56 activates the actuator 28 and retracts the pothole protection mechanism 20. If the lifting platform is not below the trigger point (NO in step S11) or the system determines that additional factors are present that require attention before retraction of the mechanism (YES in step S12), the controller 56 prevents retraction of the pothole protection mechanism 20 and sounds an alarm (step S14) or the like.

Figure 6:
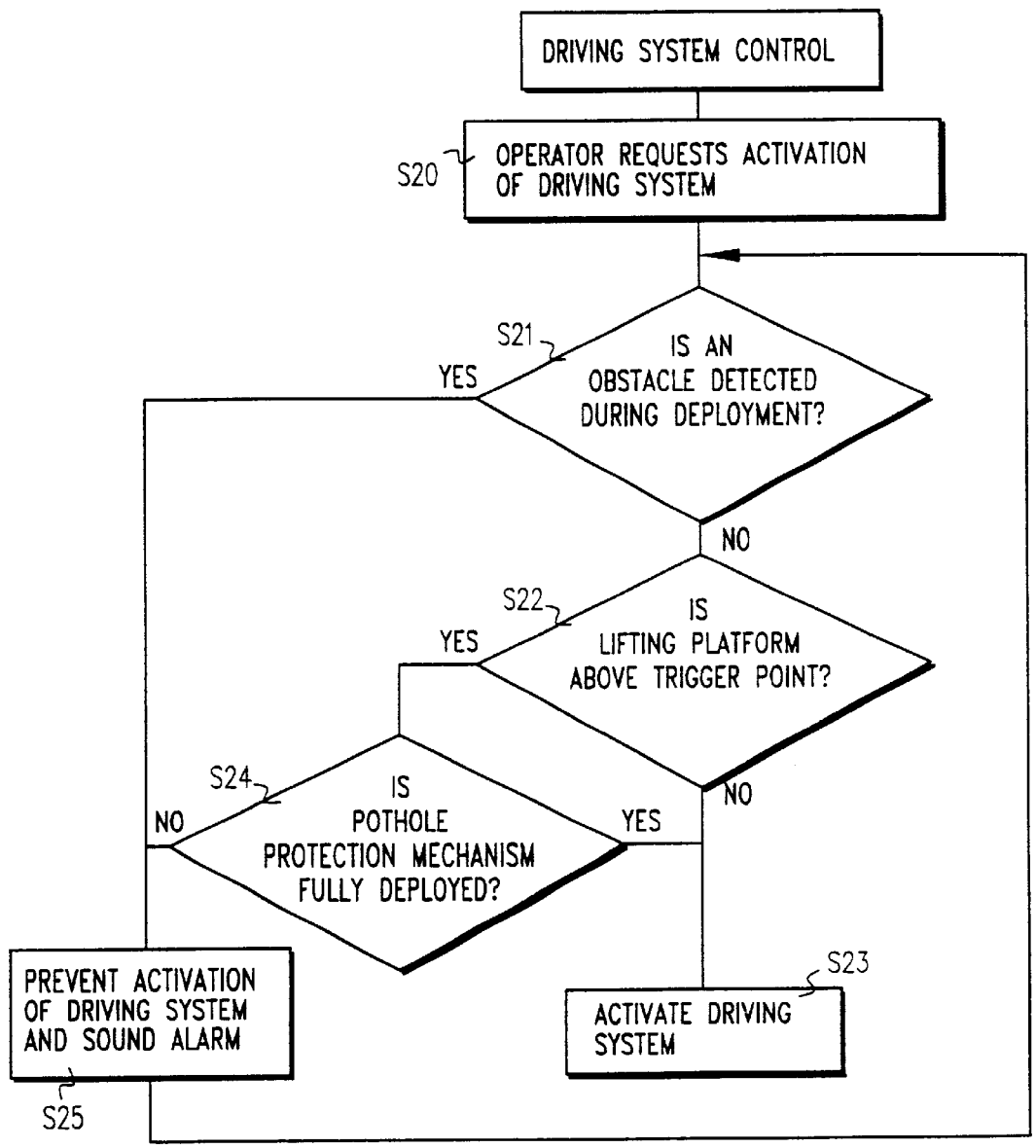
FIG. 6 is a flow diagram showing driving system control.

FIG. 6 is a flow diagram of a driving system control process performed by the machine controller 56. In step S20, an operator requests activation of the driving system 50. The controller in step S21 determines whether an obstacle is detected during deployment. If not (NO in step S21), the controller determines whether the lifting platform 14 is above the trigger point (step S22). If the answer in step S22 is NO, the controller 56 activates the driving system (step S23). If YES in step S22, the system determines whether the pothole protection mechanism 20 is fully deployed (step S24), and if so, the driving system 50 is activated. If an obstacle is detected during deployment (YES in step S21) or if the pothole protection mechanism 20 is not fully deployed when the lifting platform 14 is above the trigger point (NO in step S24), activation of the driving system 50 is prevented and an alarm is sounded (step S25).

With the structure of the present invention, a pothole protection mechanism for a lift machine can utilize a relatively small actuator to reduce manufacturing and maintenance costs. Moreover, since the pothole protection mechanism is without a mechanical linkage to a lifting component of the lift machine, the mechanism can be deployed according to factors unrelated to the platform height. The mechanism is particularly suited for an industrial machine including a lifting platform or other lifting type structure.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A pothole protection mechanism for a lift machine including front wheels and rear wheels, the pothole protection mechanism comprising:
   a frame securable to the lift machine;
   a pothole protection bar movably coupled with the frame within an area defined by the front wheels and the rear wheels of the lift machine via a support linkage; and
   an actuator coupled between the frame and the pothole protection bar, the actuator being sized for a force sufficient to lift the pothole protection bar yet insufficient to support the lift machine weight.

2. A pothole protection mechanism according to claim 1, wherein the pothole protection mechanism is without a mechanical linkage for securing to a lifting component of the lift machine.

3. A pothole protection mechanism according to claim 1, wherein the actuator is an electromechanical actuator that drives the pothole protection bar between a retracted position and an extended position.

4. A pothole protection mechanism according to claim 1, further comprising a latching assembly coupled between the frame and the pothole protection bar, the latching assembly releasably securing the pothole protection bar in a retracted position, wherein the actuator drives the pothole protection bar from an extended position to the retracted position.

5. A pothole protection mechanism according to claim 1, wherein the support linkage comprises:
   a pair of two-link joints that pivot at a link attachment point, each of the two-link joints being secured at a first end to opposite sides of the frame, respectively, and at a second end to the pothole protection bar; and
   a coupling bar attached to each link attachment point of the two-link joints between the two-link joints,
   wherein the actuator is attached to the coupling bar.

6. A pothole protection mechanism according to claim 5, wherein the pothole protection bar is movable between a retracted position and an extended position, and wherein in the extended position, the two-link joints are pivoted to an over-center position and the coupling bar is abutted against a stop.

7. A pothole protection mechanism according to claim 6, wherein the actuator is in an extended position when the pothole protection bar is in its retracted position, and wherein the actuator is in a retracted position when the pothole protection bar is in its extended position.

8. A pothole protection mechanism according to claim 1, wherein the support linkage comprises a coupling bar driven by the actuator, the coupling bar pivoting a joint secured between the frame and the pothole protection bar between an extended position and a retracted position, wherein the coupling bar is abutted against a stop when the joint is in the extended position.

9. A pothole protection mechanism according to claim 1, wherein the actuator comprises stroke switches that provide a signal to indicate when the pothole protection bar is in a fully extended position and a fully retracted position, respectively.

10. A pothole protection mechanism according to claim 1, wherein the actuator comprises means for detecting obstacles in a path of the pothole protection bar.

11. A pothole protection mechanism according to claim 10, wherein the detecting means comprises a current-monitoring circuit coupled with the actuator that monitors current to the actuator.

12. A lift machine comprising:
   a base supporting a lifting platform, the lifting platform being displaceable between a lowered position and a raised position via a lifting mechanism;
   front wheels and rear wheels rotatably mounted on respective axles secured to the base; and
   a pothole protection mechanism including:
      a frame secured to the base,
      a pothole protection bar movably coupled with the frame within an area defined by the front wheels and the rear wheels via a support linkage, and
      an actuator coupled between the frame and the pothole protection bar, the actuator being sized for a force sufficient to lift the pothole protection bar yet insufficient to support the lift machine weight.

13. A lift machine according to claim 12, further comprising:
   a driving system coupled with the wheels and providing motive power to the wheels; and
   a sensor that monitors a position of the lifting platform, wherein the pothole protection mechanism further comprises a controller communicating with the sensor, the driving system and the actuator, the controller controlling operation of the driving system and the actuator based on a signal received from the sensor.

14. A lift machine according to claim 13, wherein the when the lifting platform is raised above the lowered position beyond a trigger point, the controller prevents operation of the driving system until the pothole protection mechanism is fully deployed.

15. A lift machine according to claim 13, wherein when the lifting platform is raised above the lowered position beyond a trigger point and the pothole protection mechanism is deployed, the controller prevents retraction of the pothole protection mechanism until the lifting platform is lowered below the trigger point.

16. A lift machine according to claim 13, wherein the actuator comprises means for detecting obstacles in a path of the pothole protection bar, and wherein the controller prevents operation of the driving mechanism and operation of the pothole protection mechanism if an obstacle is detected in the path of the pothole protection bar.

17. A lift machine according to claim 13, wherein the controller controls operation of the pothole protection mechanism according to factors independent of lifting platform height.

18. A lift machine according to claim 17, further comprising a platform extension coupled with the lifting platform, wherein one of the factors for controlling operation of the pothole protection mechanism comprises a position of the platform extension.

19. A lift machine according to claim 17, wherein the factors for controlling operation of the pothole protection mechanism comprise at least one of a position of a material handling device, a load on the platform, a load on the material handling device, and a configuration of the lift machine.

20. A pothole protection mechanism for a lift machine including front wheels and rear wheels, the pothole protection mechanism comprising:

a frame securable to the lift machine;

a pothole protection bar movably coupled with the frame within an area defined by the front wheels and the rear wheels of the lift machine via a support linkage; and an actuator coupled between the frame and the pothole protection bar, wherein the support linkage comprises a coupling bar driven by the actuator, the coupling bar pivoting a joint secured between the frame and the pothole protection bar between an extended position and a retracted position, wherein the coupling bar is abutted against a stop when the joint is in the extended position.

* * * * *